US010742505B2

(12) United States Patent
Wackerly et al.

(10) Patent No.: US 10,742,505 B2
(45) Date of Patent: Aug. 11, 2020

(54) RECONCILING INFORMATION IN A CONTROLLER AND A NODE

(71) Applicant: HEWLETT PACKARD ENTERPRISE DEVELOPMENT LP, Houston, TX (US)

(72) Inventors: Shaun Wackerly, Roseville, CA (US); Sean E. Humphress, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 482 days.

(21) Appl. No.: 15/117,466

(22) PCT Filed: Mar. 28, 2014

(86) PCT No.: PCT/US2014/032154
§ 371 (c)(1),
(2) Date: Aug. 9, 2016

(87) PCT Pub. No.: WO2015/147859
PCT Pub. Date: Oct. 1, 2015

(65) Prior Publication Data
US 2016/0359669 A1 Dec. 8, 2016

(51) Int. Cl.
*G06F 15/177* (2006.01)
*H04L 12/24* (2006.01)
*H04L 12/18* (2006.01)

(52) U.S. Cl.
CPC ...... *H04L 41/0866* (2013.01); *H04L 12/1886* (2013.01); *H04L 41/0853* (2013.01); *H04L 41/5096* (2013.01)

(58) Field of Classification Search
CPC ............ H04L 41/0866; H04L 12/1886; H04L 41/0853; H04L 41/5096
(Continued)

(56) References Cited

U.S. PATENT DOCUMENTS 8,554,750 B2 * 10/2013 Rangarajan ....... G06F 17/30371
707/690
2006/0190454 A1 8/2006 Kato et al.
(Continued)

FOREIGN PATENT DOCUMENTS

WO WO-2013/020126 A1 2/2013

OTHER PUBLICATIONS

Amin Tootoonchian and Yashar Ganjali, "HyperFlow: A Distributed Control Plane for OpenFlow," Apr. 7, 2010, pp. 1-6, Available at: <usenix.org/legacy/events/inmwren10/tech/full_papers/Tootoonchian.pdf>.
(Continued)

*Primary Examiner* — Taylor A Elfervig
(74) *Attorney, Agent, or Firm* — Trop, Pruner & Hu, P.C.

(57) ABSTRACT

A controller, which manages nodes that provide virtual entities, receives information from a first of the nodes, where the received information relates to a characteristic of a virtual entity provided by the first node. The controller determines that the received information is inconsistent with information, maintained by the controller, relating to the characteristic of the virtual entity provided by the first node. In response to the determining, the controller reconciles an inconsistency between the received information and the information maintained by the controller.

20 Claims, 5 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2011/0051622 A1* | 3/2011 | Bosneag | H04L 41/12 370/254 |
| 2011/0161328 A1* | 6/2011 | Park | G06F 17/30241 707/743 |
| 2011/0295727 A1* | 12/2011 | Ferris | G06F 11/34 705/34 |
| 2012/0035746 A1* | 2/2012 | Broom | G06Q 10/087 700/21 |
| 2012/0151040 A1* | 6/2012 | Mouravyov | H04L 41/0856 709/224 |
| 2013/0060819 A1* | 3/2013 | Lambeth | H04L 12/4633 707/803 |
| 2013/0114607 A1* | 5/2013 | McGovern | H04L 12/462 370/395.53 |
| 2013/0194914 A1 | 8/2013 | Agarwal et al. | |
| 2013/0301658 A1 | 11/2013 | Chiba | |
| 2013/0322440 A1 | 12/2013 | Chiba | |
| 2014/0016648 A1 | 1/2014 | Hidaka | |

OTHER PUBLICATIONS

International Search Report and Written Opinion, International Application No. PCT/US2014/032154, dated Dec. 11, 2014, pp. 1-11, KIPO.

* cited by examiner

RECONCILING INFORMATION IN A CONTROLLER AND A NODE

BACKGROUND

A network can be made up of a network infrastructure (including various network entities) that is used by devices to communicate with each other through the network. Examples of network entities include switches, routers, configuration servers (e.g. Dynamic Host Configuration Protocol or DHCP servers), and so forth.

Traditionally, the network infrastructure of a particular network is owned by a network operator. For example, an enterprise, such as a business concern, educational organization or government agency, can operate a network for use by users (e.g. employees, customers, etc.) of the enterprise. The network infrastructure of such network is owned by the enterprise.

In an alternative arrangement, instead of using a network operator's own network infrastructure to implement a network, the network operator can instead pay to use networking entities provided by a third party service provider. The service provider provides an infrastructure that includes various network entities accessible by customers (also referred to as "tenants") of the service provider. By using the infrastructure of the service provider, a network operator would not have to invest in various components of a network infrastructure, and would not have to be concerned with maintenance of the network infrastructure.

BRIEF DESCRIPTION OF THE DRAWINGS

Some implementations are described with respect to the following figures.

DETAILED DESCRIPTION

Figure 1:
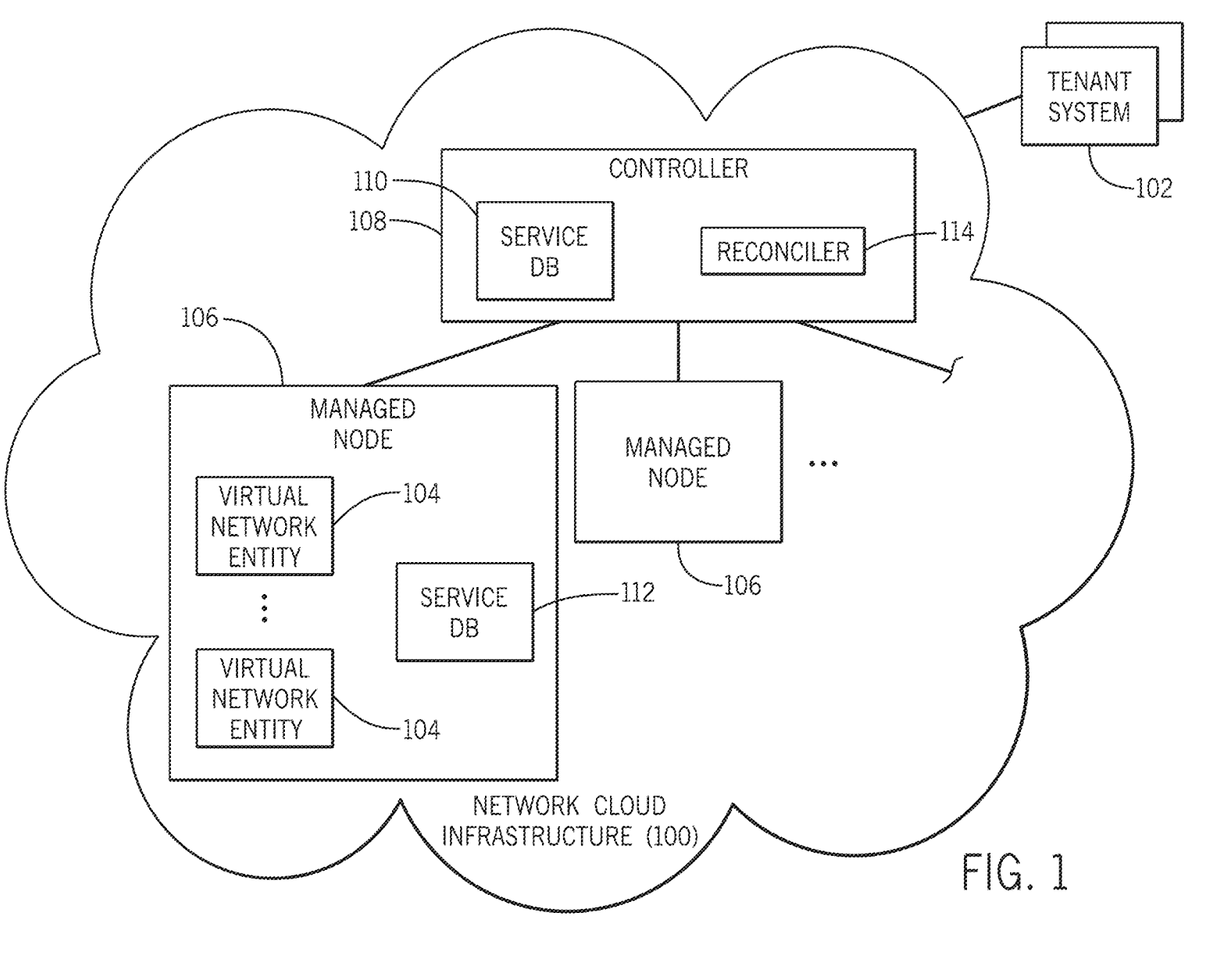
FIG. 1 is a block diagram of an example arrangement that includes a network cloud infrastructure and tenant systems, according to some implementations.

FIG. 1 is a block diagram of an example arrangement that includes a network cloud infrastructure 100, which may be operated and/or owned by a network service provider. The network cloud infrastructure 100 has customers (also referred to as "tenants") that operate respective tenant systems 102. Each tenant system 102 can include a network deployment that uses network entities of the network cloud infrastructure 100. The provision of network entities of a network cloud infrastructure by a network service provider to a tenant is part of a cloud-service model that is sometimes referred to as network as a service (NaaS) or infrastructure as a service (IaaS).

The network entities in the network cloud infrastructure that are available for use by tenant systems 102 are referred to as "virtual network entities." The network entities are "virtual" in the sense that the network entities are not physical entities within a network deployment of a respective tenant system 102, but rather entities that can be logically implemented in the network deployment. As shown in FIG. 1, virtual network entities 104 are hosted by managed nodes 106 (e.g. server computers, physical switches, etc.). A virtual network entity being hosted by a managed node 106 refers to the virtual network entity being executable by the managed node 106 (in cases where the virtual network entity is implemented as machine-readable instructions). Alternatively, a virtual network entity hosted by a managed node 106 can refer to some partition of the managed node, where the partition can include hardware as well as machine-readable instructions.

Examples of virtual network entities 104 include any or some combination of the following network resources: a switch for switching data between devices at layer 2 of the Open Systems Interconnection (OSI) model; a router for routing data at layer 3 of the OSI model; a port of a transport protocol such as the Transmission Control Protocol (TCP); an Internet Protocol (IP) address (which identifies an endpoint of a network); a configuration server, such as a Dynamic Host Configuration Protocol (DHCP) server used for setting network configuration parameters such as IP addresses for devices that communicate over a network; a security enforcement entity (for enforcing a security policy); a network; a subnet of a network (note that a network can include multiple subnets that make up different segments of the network); and so forth. Although example network resources are provided above, it is noted that virtual network entities can also include other types of network resources that are useable in a network deployment of a tenant system 102. Additionally or alternatively, a virtual network entity can also refer to a network service, such as any or some combination of the following: switching service, routing service, DHCP configuration service, security service, and so forth.

The managed nodes 106 hosting respective virtual network entities 104 are managed by a controller 108. Each managed node 106 can include one or multiple virtual network entities 104. The controller 108 is able to direct which virtual network entities 104 are hosted on which managed nodes 106. Although just one controller 108 is shown in FIG. 1, it is noted that in other examples, the network cloud infrastructure 100 can include multiple controllers 108 for managing the managed nodes 106.

The arrangement shown in FIG. 1 in which the controller 108 manages managed nodes 106 can be part of a software-defined networking (SDN) arrangement, in which machine-readable instructions executed by the controller 108 perform management of the managed nodes 106. In the SDN arrangement, the controller 108 is part of a control plane, while the managed nodes 106 are part of a user plane through which traffic is communicated. Tenant or user traffic does not have to be communicated through the control plane. The controller 108 is responsible for determining where (which of the managed nodes 106) a virtual network entity 104 is to be hosted, while a managed node is responsible for deploying a specific network resource or service.

The controller 108 has a service database 110 that contains information of virtual network entities deployed at various managed nodes 106. In addition, each managed node 106 has a respective service database 112 that contains information of virtual network entities 104 hosted by the respective managed node 106. The service database 110 can be stored on a storage medium within the controller 108, or on a storage medium that is outside the controller 108 but that is accessible by the controller 108. Similarly, the service database 112 can be stored on a storage medium within a respective managed node 106, or on a storage medium outside the respective managed node 106 but that is accessible by one or multiple managed nodes 106.

The information stored in the service database 110 or 112 can include state information and configuration information. State information can specify a status of the virtual network entity 104, such as if the virtual network entity 104 is operational or not operational (e.g. whether a router is forwarding traffic or the router is not forwarding traffic), whether a port is up or down, whether a network is operational or not operational, whether a subnet is operational or not operational, and so forth. Configuration information can specify a capability or configuration of a virtual network entity. For example, the configuration information can identify subnets of a network, specify values of parameters that affect operation of a virtual network entity (e.g. parameters of a switch, router, or DHCP server), indicate whether or not a virtual network entity can be accessed by a tenant system, and so forth.

More generally, a cloud infrastructure can include virtual entities 104 that are useable in a tenant system 102. Such virtual entities can include processing resources, storage resources, software (in the form of machine-readable instructions), and so forth.

In the ensuing discussion, reference is made to virtual network entities of a network cloud infrastructure. However, techniques or mechanisms according to some implementations can be applied to other types of virtual entities provided by nodes of a cloud infrastructure.

Occasionally, the view (as represented by the information in the service database 110) of the controller 108 can become inconsistent with the view (as represented by the information in a service database 112) of a particular managed node 106. For example, the particular managed node may experience a fault, the controller 108 may experience a fault, or communication between the particular managed node 106 and the controller 108 may have been temporarily lost.

In some examples, managed nodes 106 can periodically poll the controller 108 for any changes relating to virtual network entities 104 hosted by the respective managed nodes since the last update. Such polling can be performed using OpenStack components in the managed nodes 106 and the controller 108, where OpenStack provides an open source cloud computing platform for cloud systems. An issue associated with managed nodes 106 periodically polling the controller 108 is that such polling can result in a large number of messages communicated between the managed nodes 106 and the controller 108. If the network cloud infrastructure 100 has a relatively large number of managed nodes, the increase in polling messages can consume control plane bandwidth in the network cloud infrastructure 100 that can lead to reduced performance or delayed response in the network cloud infrastructure 100. Also, the network cloud infrastructure 100 becomes less scalable, since increasing the number of managed nodes leads to an even larger number of polling messages.

In accordance with some implementations, the controller 108 does not rely on periodic polling by managed nodes 106. The controller 108 includes a reconciler 114 that is able to reconcile any inconsistencies between the service database 110 of the controller 108 and service databases 112 of the managed nodes 106. In some implementations, the reconciler 114 is able to perform a cleanup phase and a synchronization phase. In the cleanup phase, the reconciler 114 can remove stale virtual network entities from managed nodes 106. A stale virtual network entity can refer to a virtual network entity that currently exists but that should have been removed previously. In the synchronization phase, the reconciler 114 can perform updates to achieve consistency between the views of managed nodes 106 and the controller 108.

Figure 2:
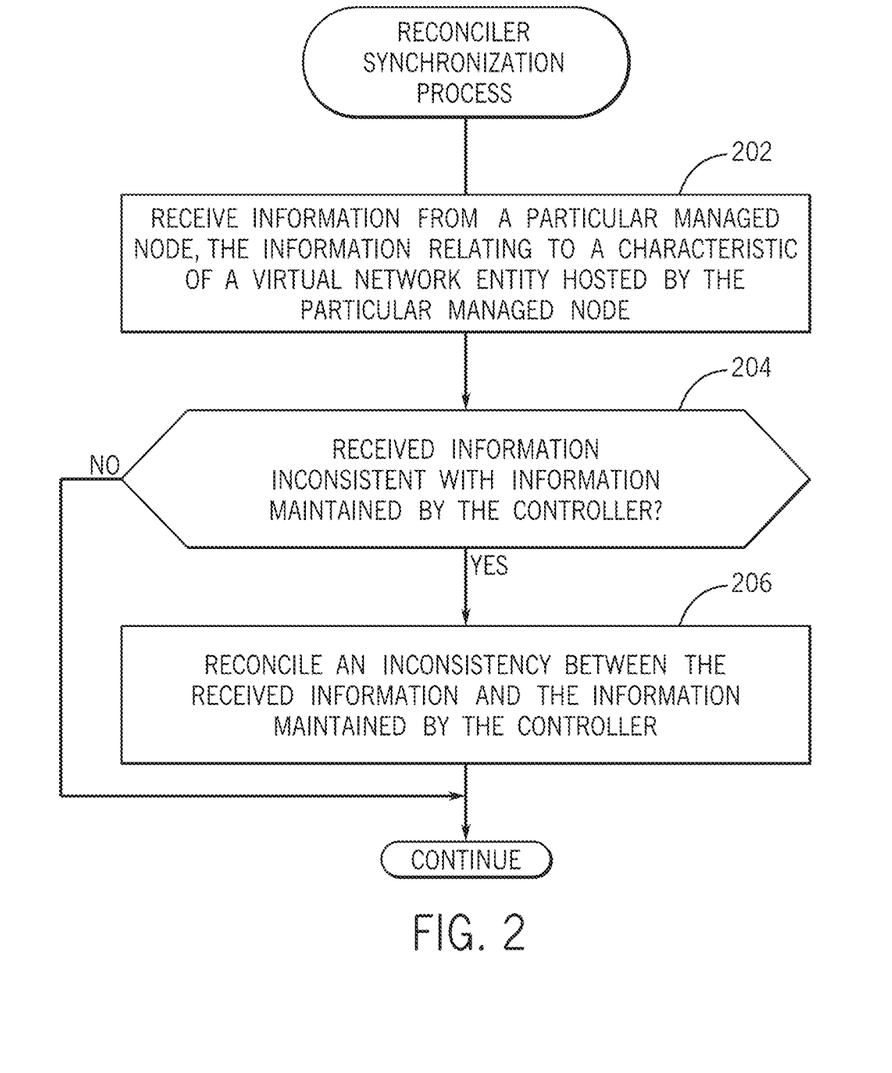
FIG. 2 is a flow diagram of a synchronization process according to some implementations.

FIG. 2 is a flow diagram of a synchronization process of a synchronization phase performed by the reconciler 114 in the controller 108, in accordance with some implementations. The reconciler 114 receives (at 202) information from a particular one of the managed nodes 106 in the network cloud infrastructure 100. The received information relates to a characteristic (e.g. state and/or configuration) of a virtual network entity hosted by the particular managed node. The received information can include information contained or derived from information stored in the service database 112 of the particular managed node.

The reconciler 114 determines (at 204) whether the received information from the particular managed node is inconsistent with information maintained by the controller relating to the characteristic of the virtual network entity hosted by the particular managed node. The information maintained by the controller 108 includes information retrieved from or derived from information in the service database 110. If the received information is not inconsistent with information maintained by the controller 108, then no reconciliation action is performed by the reconciler 114. However, if the received information is determined to be inconsistent with the information maintained by the controller 108, then the reconciler 114 reconciles (at 206) an inconsistency between the received information and the information maintained by the controller 108. The reconciling includes one or some combination of the following: updating information relating to a virtual network entity in the service database 110 or 112 (and possibly updating a version of the virtual network entity in a managed node 106), or adding information relating to a virtual network entity to the service database 110 or 112 (and possibly adding the virtual network entity to a managed node 106), or removing information relating to a virtual network entity from the service database 110 or 112 (and possibly removing the virtual network entity from a managed node 106).

Figure 3:
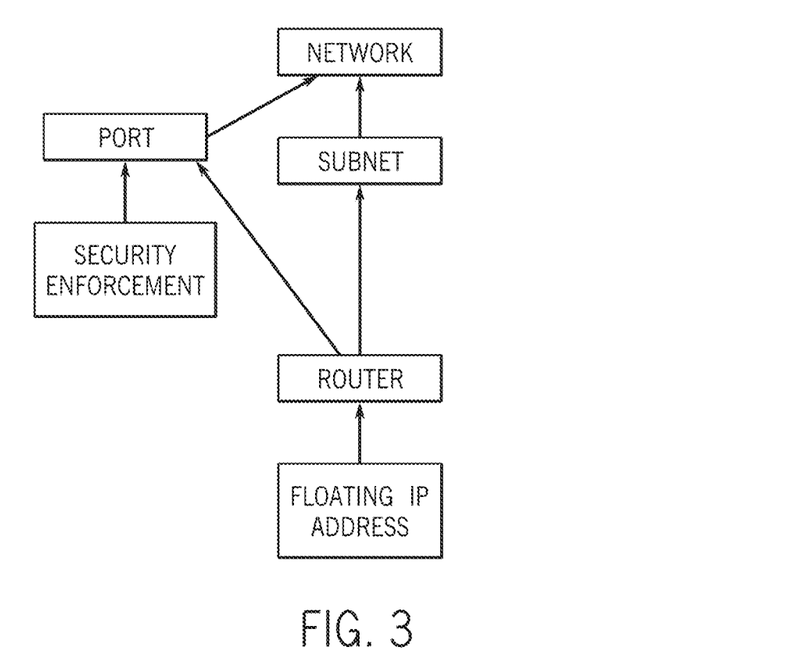
FIG. 3 is a schematic diagram of a hierarchical arrangement of types of network entities, according to some examples.

There can be multiple different types of virtual network entities. Some example types of virtual network entities are depicted in FIG. 3. The different types of virtual network entities have a hierarchical relationship, as depicted in the hierarchical arrangement shown in FIG. 3. The root of the hierarchical arrangement shown in the example of FIG. 3 is a network (which is one type of virtual network entity). Another type of virtual network entity is a subnet, which depends on the network. In other words, a subnet is part of the network (a network can include multiple subnets). Other virtual network entity types shown in FIG. 3 include a port (which depends on the network), a router (which depends on the subnet and the port), and a floating IP address (which depends on the router). As further shown in FIG. 3, another virtual network entity is a security enforcement service, which depends on the port. A floating IP address refers to an IP address that can be dynamically added to a virtual network entity, which in the case of FIG. 3 is the router. In some examples, floating IP addresses are supported in an OpenStack architecture. In other examples, floating IP addresses can be used in other architectures.

A first network virtual entity depending on a second virtual network entity refers to the first virtual network entity having a relationship with the second virtual network entity where the first virtual network entity's operation or existence is in the context of the second virtual network entity. In the example hierarchical arrangement shown in FIG. 3, the root (network) is at the top of the hierarchical arrangement, while a leaf is at the lowest level of the hierarchical arrangement. Two leaves exist in the hierarchical arrangement of FIG. 3: floating IP address and security enforcement service.

Figure 4:
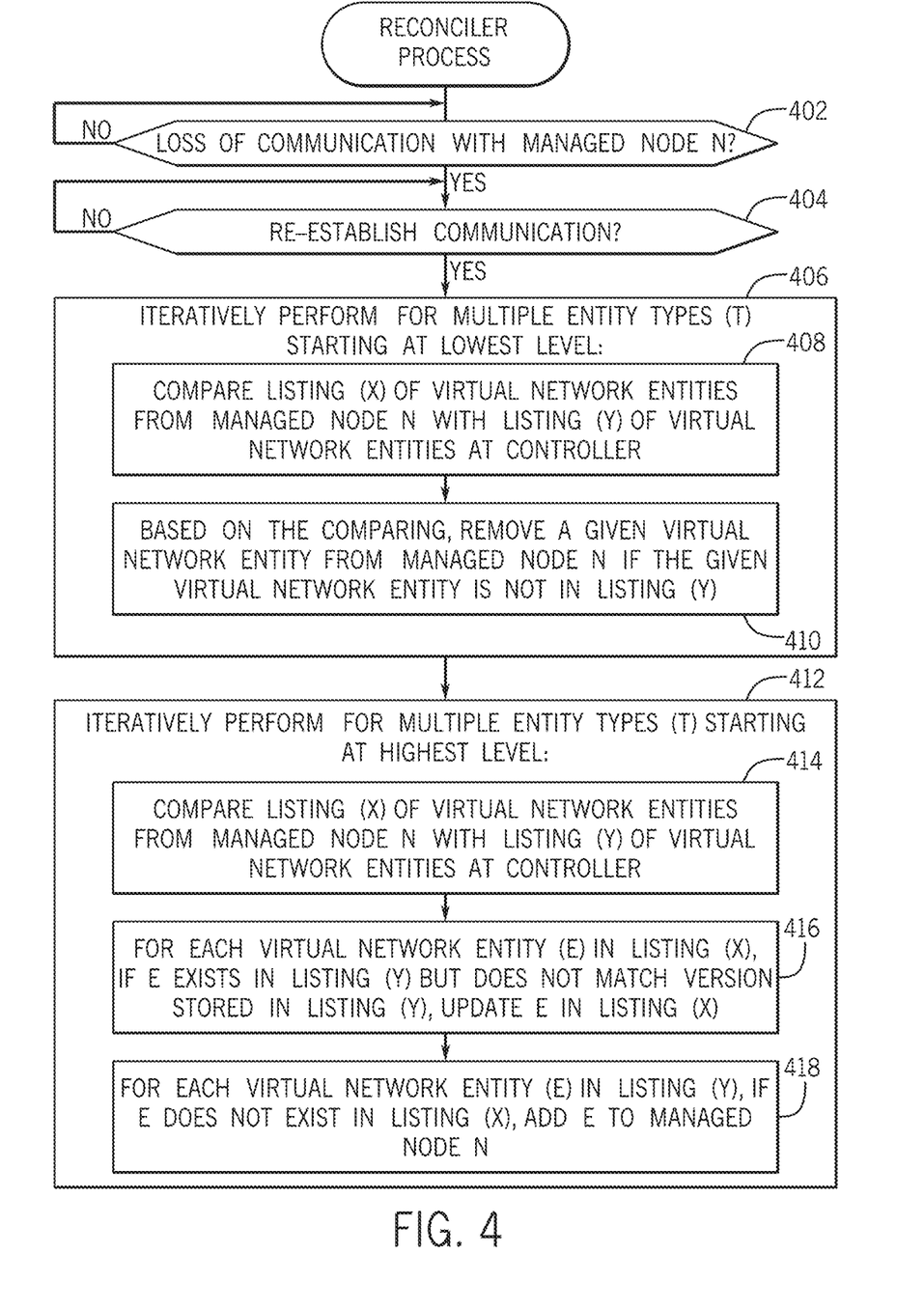
FIG. 4 is a flow diagram of a process of a reconciler, according to further implementations.

FIG. 4 is a flow diagram of a process performed by the reconciler 114, according to further implementations. The reconciler 114 determines (at 402) if loss of communication with a managed node N (managed node N is one of the managed nodes 106) has occurred. Loss of communication between the controller 108 and managed node N can occur due to various reasons, including fault at the controller 108, fault at managed node N, or fault in the communications link between the controller 108 and managed node N. Note that the process of FIG. 4 is performed for each of the multiple managed nodes 106 in the network cloud infrastructure 100 that are associated with the controller 108.

In response to determining that loss of communication with managed node N has occurred, the reconciler 114 determines (at 404) if communication has been re-established with managed node N. If not, the reconciler 114 continues to wait for re-establishment of communication with managed node N. However, if communication has been re-established with managed node N, then the reconciler 114 proceeds to perform a cleanup phase 406.

The cleanup phase 406 iteratively performs tasks for each of multiple virtual network entity types (assuming managed node N has multiple types of virtual network entities). The iterative performance of tasks in the cleanup phase 406 starts at the virtual network entity type at the lowest level (the level closest to a leaf in FIG. 3) of the hierarchical arrangement. More generally, the iterative performance of tasks in the cleanup phase 406 iterates in an order of dependency such that any virtual network entity type A that depends upon virtual network entity type B appears earlier in the iteration than virtual network entity type B.

In the cleanup phase 406, the reconciler 114 compares (at 408) a listing (X) of a virtual network entities received from managed node N with a listing (Y) of virtual network entities at the controller 108. The listing (X) is retrieved or derived from the service database 112 of managed node N, while the listing (Y) of virtual network entities is retrieved or derived from the service database 110 of the controller 108.

The listing (X) can be received from managed node N in response to a query from the controller 108 to the managed node N. The listing (X) of virtual network entities and the listing (Y) of virtual network entities identify virtual network entities of type T, which is the virtual network entity type that is currently considered in the iterative cleanup phase 406.

Based on the comparing, the reconciler 114 removes (at 410) a given virtual network entity of type T from managed node N if the given virtual network entity is not in listing (Y) of the controller 108.

Tasks 408 and 410 are iteratively performed for each of different virtual network entity types (T) in managed node N.

After the cleanup phase 406, the reconciler 114 proceeds to a synchronization phase 412. The synchronization stage 412 iteratively performs tasks for each of multiple virtual network entity types in managed node N, starting at the highest level of the hierarchical arrangement (the level closest to the root in FIG. 3, for example). More generally, the iterative performance of tasks in the synchronization phase 412 iterates in an order of dependency such that any virtual network entity type A that depends upon virtual network entity type B appears later in the iteration than virtual network entity type B.

For a current virtual network entity type T that is currently considered in the iterative synchronization phase 412, the reconciler 114 compares (at 414) a listing (X) of virtual network entities obtained from managed node (N) with a listing (Y) of virtual network entities of the controller 108. For each virtual network entity (E) of type T that is identified in the listing (X), if E exists in the listing (Y) but does not match a version stored in the listing (Y), then E is updated (at 416) in the listing (X). Updating E in the listing (X) also causes the version of the virtual network entity E to be updated at managed node N. A virtual network entity may exist but not match if there exists a virtual network entity where the characteristics (e.g. a unique identifier) that uniquely identify the virtual network entity match, but the remaining fields of the virtual network entity (other associated data) do not match. For example, listing (X) and listing (Y) may each identify a virtual network entity E that shares a common unique ID. However, listing (X) and listing (Y) may have at least one attribute of virtual network entity E that differ in value, which means that the versions of virtual network entity E identified in listing (X) and listing (Y) are inconsistent.

Moreover, for each virtual network entity (E) identified in listing (Y), if E does not exist in listing (X), then the virtual network entity (E) is added (at 418) to the listing (X) (note that the virtual network entity (E) is also added to the managed node N).

Tasks 414, 416, and 418 are performed for each of the other virtual network entity types that exist in managed node N.

In further implementations, to improve performance, the listing (X) and the listing (Y) may be cached in cache memory accessible by the reconciler 114, so that such listings can be retrieved more quickly.

By employing techniques or mechanisms according to some implementations, reconciliation between views of virtual network entities maintained by managed nodes 106 and the controller 108 occurs when a fault occurs (e.g. loss of communication detected at 402 in FIG. 4). As a result, messaging associated with such reconciliation is communicated when the fault occurs, which reduces network traffic since faults occur relatively infrequently.

Figure 5:
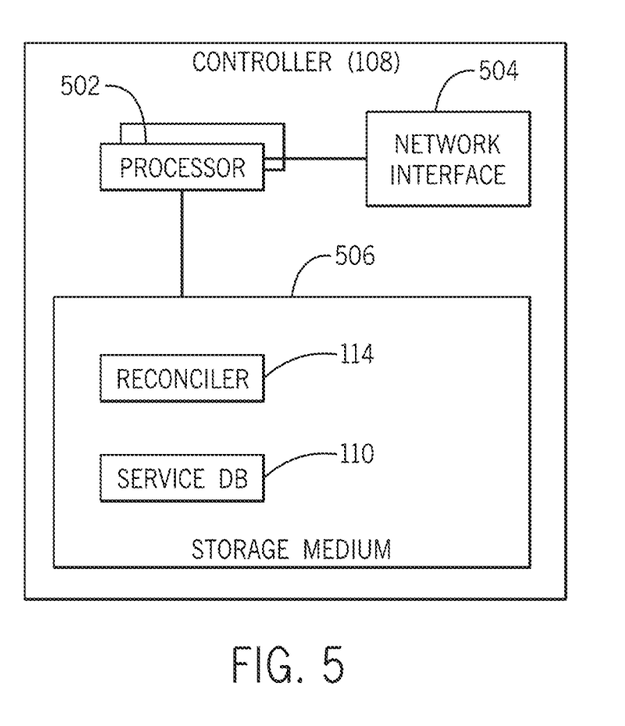
FIG. 5 is a block diagram of a controller incorporating some implementations.

FIG. 5 is a block diagram of an arrangement of the controller 108 according to some implementations. The controller 108 can include one or multiple processors 502, which can be coupled to one or multiple network interfaces 504 (to allow the controller 108 to communicate over a network), and to a non-transitory machine-readable or computer-readable storage medium 506 (or multiple storage media). The storage medium or storage media 506 can store the reconciler 114 in the form of machine-readable instructions, as well as the service database 110. The reconciler 114 can be loaded from the storage medium or storage media 506 for execution on the processor(s) 502. A processor can include a microprocessor, microcontroller, processor module or subsystem, programmable integrated circuit, programmable gate array, or another control or computing device.

The storage medium (or storage media) 506 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a controller in an infrastructure in which the controller manages nodes that provide virtual entities, information from a first of the nodes, the received information relating to a characteristic of a virtual entity provided by the first node, the virtual entities including at least two types, at least one type of the virtual entities having a structurally hierarchical relationship with at least one other type of the virtual entities, the at least two types of virtual entities including at least two of a virtual network, a subnet, a port, a router, and a floating address;
   determining, by the controller, that the received information is inconsistent with information indicating connected virtual network entities, maintained by the controller, relating to the characteristic of the virtual entity provided by the first node, wherein the received information comprises a listing of virtual network entities; and
   in response to the determining, reconciling, by the controller, an inconsistency between the received information and the information maintained by the controller by iteratively performing a clean up process for multiple entity types starting at a lowest level of the hierarchy and iteratively performing a synchronization for multiple entity types starting at a highest level of the hierarchy.

2. The method of claim 1, further comprising:
   selecting, by the controller, nodes on which respective virtual entities are deployed.

3. The method of claim 1, further comprising:
   querying, by the controller, a particular one of the nodes for identification of virtual entities on the particular node;
   determining, by the controller, whether a given one of the virtual entities on the particular node is not identified by information maintained by the controller regarding virtual entities on the particular node; and
   in response to determining that the given virtual entity on the particular node is not identified by the information maintained by the controller regarding virtual entities on the particular node, cause, by the controller, removal of the given virtual entity from the particular node.

4. The method of claim 3, wherein the querying comprises querying the particular node for identification of virtual entities of a first type from among a plurality of types of virtual entities on the particular node.

5. The method of claim 4, further comprising:
   querying, by the controller, the particular node for identification of virtual entities of a second of the plurality of types on the particular node;
   determining, by the controller, whether a given one of the second type of virtual entities on the particular node is not identified by the information maintained by the controller regarding virtual entities on the particular node; and
   in response to determining that the given one of the second type of virtual entities on the particular node is not identified by the information maintained by the controller regarding virtual entities on the particular node, cause, by the controller, removal of the given one of the second type of virtual entities from the particular node.

6. The method of claim 5, wherein the virtual entities of the plurality of types on the particular node have hierarchical dependencies such that the first type of virtual entities depends on the second type of virtual entities, and wherein the querying for identification of virtual entities of the first type occurs before the querying for identification of virtual entities of the second type based on the hierarchical dependency between the first type of virtual entities and the second type of virtual entities.

7. The method of claim 1, wherein determining that the received information is inconsistent with the information maintained by the controller comprises determining that at least one attribute in the received information does not match at least one attribute in the information maintained by the controller, the at least one attribute in the received information relating to the characteristic of the virtual entity provided by the first node.

8. The method of claim 1, further comprising providing at least a subset of the virtual entities for use in a deployment of a tenant system associated with a customer of a provider of the infrastructure.

9. The method of claim 1, further comprising removing a virtual entity from the first node in response to detecting an inconsistency.

10. The method of claim 1 wherein the floating address comprises a floating internet protocol (IP) address.

11. A controller to control managed nodes in a network infrastructure, comprising:
    at least one processor to:
      receive information of virtual network entities hosted by a first of the managed nodes, the received information relating to characteristics of the virtual network entities, the virtual network entities including at least two types, at least one type of the virtual network entities having a structurally hierarchical relationship with at least one other type of the virtual network entities, the at least two types of virtual entities including at least two of a virtual network, a subnet, a port, a router, and a floating address;
      compare the received information to information maintained by the controller for the virtual network entities hosted by the first managed node, wherein the information indicate connected virtual network entities and the received information comprises a listing of virtual network entities; and
      in response to the comparing indicating inconsistency between the received information and the information maintained by the controller, iteratively perform a clean up process for multiple entity types starting at a lowest level of the hierarchy and iteratively perform a synchronization for multiple entity types starting at a highest level of the hierarchy.

12. The controller of claim 11, wherein the change at the first managed node includes at least one of updating at least one virtual network entity at the first managed node, removing at least one virtual network entity from the first managed node, and adding at least one virtual network entity to the first managed node.

13. The controller of claim 11, wherein the at least one processor is to perform the receiving, the comparing, and the causing the change in response to detecting a loss of communication between the controller and at least one of the managed nodes.

14. The controller of claim 11, wherein the receiving, the comparing, and the causing the change are part of a synchronization phase in which the change includes at least one of updating a version of a virtual network entity at the first managed node and adding a virtual network entity to the first managed node.

15. The controller of claim 14, wherein the at least one processor is to further perform a cleanup phase to remove a virtual network entity from the first managed node in response to detecting inconsistency between information of the first managed node and information maintained by the controller.

16. The controller of claim 11 wherein the floating address comprises a floating internet protocol (IP) address.

17. An article comprising at least one non-transitory machine-readable storage medium storing instructions that upon execution cause a controller to:
  receive information from a first of a plurality of nodes of an infrastructure that are managed by the controller, the received information relating to a characteristic of a virtual entity provided by the first node, the virtual entity being one of a plurality of virtual entities including at least two types, at least one type of the virtual entities having a structurally hierarchical relationship with at least one other type of the virtual entities, the at least two types of virtual entities including at least two of a virtual network, a subnet, a port, a router, and a floating address;
  determine whether the received information is inconsistent with information, maintained by the controller, relating to the characteristic of the virtual entity provided by the first node, wherein the information indicate connected virtual network entities and the received information comprises a listing of virtual network entities;
  in response to determining that the received information is inconsistent with the information maintained by the controller, reconcile an inconsistency between the received information and the information maintained by the controller by iteratively performing a clean up process for multiple entity types starting at a lowest level of the hierarchy and iteratively performing a synchronization for multiple entity types starting at a highest level of the hierarchy; and
  in response to determining that the received information is not inconsistent with the information maintained by the controller, determining to not perform the reconciling.

18. The article of claim 17 wherein the floating address comprises a floating internet protocol (IP) address.

19. The article of claim 17, further comprising selecting, by the controller, nodes on which respective virtual entities are deployed.

20. The article of claim 17, further comprising:
  querying, by the controller, a particular one of the nodes for identification of virtual entities on the particular node;
  determining, by the controller, whether a given one of the virtual entities on the particular node is not identified by information maintained by the controller regarding virtual entities on the particular node; and
  in response to determining that the given virtual entity on the particular node is not identified by the information maintained by the controller regarding virtual entities on the particular node, cause, by the controller, removal of the given virtual entity from the particular node.

* * * * *